(12) United States Patent
Denier

(10) Patent No.: US 7,189,928 B2
(45) Date of Patent: Mar. 13, 2007

(54) ELECTRICAL BOX EXTENDER

(75) Inventor: Dennis J. Denier, Cincinnati, OH (US)

(73) Assignee: Denier Electric Co., Inc., Ross, OH (US)

( * ) Notice: Subject to any disclaimer, the term of this patent is extended or adjusted under 35 U.S.C. 154(b) by 46 days.

(21) Appl. No.: 11/125,741

(22) Filed: May 10, 2005

(65) Prior Publication Data

US 2006/0207781 A1    Sep. 21, 2006

Related U.S. Application Data

(60) Provisional application No. 60/659,141, filed on Mar. 7, 2005.

(51) Int. Cl.
  *H02G 3/08* (2006.01)
(52) U.S. Cl. ............. 174/481; 174/480; 174/488; 220/4.02; 439/535; 248/906
(58) Field of Classification Search .......... 174/480, 174/481, 488, 500–504; 220/3.6, 3.8, 4.02; 439/535; 248/906; 361/600, 660; 335/18
See application file for complete search history.

(56) References Cited

U.S. PATENT DOCUMENTS

| 983,162 | A | | 1/1911 | Murray et al. | |
|---|---|---|---|---|---|
| 1,820,824 | A | | 8/1931 | Phiffer | |
| 2,378,861 | A | | 6/1945 | Peevey | |
| 3,468,448 | A | | 9/1969 | McHollan et al. | 220/3.6 |
| 3,575,313 | A | | 4/1971 | Trachtenberg et al. | 220/3.3 |
| 3,770,872 | A | | 11/1973 | Brown | 174/53 |
| 4,012,580 | A | * | 3/1977 | Arnold | 174/53 |
| 4,019,647 | A | | 4/1977 | Arnold | 220/3.3 |
| 4,134,636 | A | | 1/1979 | Kleinatland et al. | 339/122 R |
| 4,634,015 | A | | 1/1987 | Taylor | 220/3.7 |
| 5,042,673 | A | | 8/1991 | McShane | 220/3.7 |
| 5,550,322 | A | | 8/1996 | Tynan | 174/48 |
| 5,639,991 | A | | 6/1997 | Schuette | 174/58 |
| 5,736,674 | A | | 4/1998 | Gretz | 174/50 |
| 5,931,325 | A | | 8/1999 | Filipov | 220/3.7 |
| 5,975,323 | A | | 11/1999 | Turan | 220/3.7 |
| 6,180,879 | B1 | | 1/2001 | Gretz | 174/50 |
| 6,204,447 | B1 | | 3/2001 | Gretz | 174/50 |
| 6,307,154 | B1 | | 10/2001 | Gretz | 174/50 |
| 6,369,322 | B1 | | 4/2002 | Gretz | 174/50 |
| 6,403,883 | B1 | | 6/2002 | Morgan et al. | 174/58 |
| 6,509,524 | B1 | | 1/2003 | Gretz | 174/50 |
| 6,573,446 | B1 | | 6/2003 | Umstead | 174/50 |
| 6,777,615 | B1 | | 8/2004 | Gretz | 174/58 |
| 6,875,922 | B1 | | 4/2005 | Petak et al. | 174/58 |
| 7,038,561 | B2 | * | 5/2006 | Esty | 335/18 |
| 2003/0014939 | A1 | | 1/2003 | DeWall | 52/741 |

FOREIGN PATENT DOCUMENTS

GB     2 276 983     10/1994

* cited by examiner

*Primary Examiner*—Dhiru R. Patel
(74) *Attorney, Agent, or Firm*—Wood, Herron & Evans, L.L.P.

(57) ABSTRACT

A drywall extension sleeve for an electrical box includes a rectangular sleeve with upper and lower flanges. The extension box preferably has an outer dimension that mates with a drywall ring or box. The sleeve is preferably attached to a pre-wired assembly which includes an electric cable and electrical box, drywall ring and the electrical component wired to the cable. The extension sleeve is positioned between the drywall ring or box and the electrical component. The electrical assembly is installed and drywall is then attached to the framed-in wall. An opening is provided through the drywall for the electrical component. The electrical component is then loosened and the extension sleeve and electrical component moved outwardly. Retention clips are placed in upper and lower flanges of the extension sleeve and the electrical component is tightened, drawing the extension and the component flush against the outer surface of the drywall.

20 Claims, 6 Drawing Sheets

US 7,189,928 B2

ELECTRICAL BOX EXTENDER

RELATED APPLICATION

This application is a regular utility application of U.S. Provisional Patent Application Ser. No. 60/659,141, filed on Mar. 7, 2005. The entire disclosure of this application is incorporated herein by reference.

BACKGROUND OF THE INVENTION

Traditionally, electrical wiring has been installed by electricians one element at a time. In other words, the individual wires were run through the stud walls. These wires were then attached to electrical boxes mounted on studs or other supports such as mounting brackets. Drywall wall rings were frequently used to adapt boxes to accept wiring devices after the drywall installation. The individual electrical components, such as the switches and the outlets were then attached to the wiring in the boxes, and screwed into the box. The drywall would be installed over this, and an opening cut, either before or after installation of the drywall, to allow access to the electrical component.

In order to improve efficiency, factory-prepared, pre-wired assemblies are being utilized. Thus, when a building is wired, commercial or residential, the components are pre-assembled in a factory. Such assemblies can include, for example, the electrical components, attached with a drywall ring to a box. Typically, any drywall ears are removed from the electrical component. The box may be attached to a mounting bracket. The actual wire, usually in the form of metal clad or NM cable, is also pre-attached to the box and connected to the electrical component. The electrician attaches the bracket at the appropriate location, runs the cable up through the wall, and attaches it to the next assembly. This greatly reduces the electrician's time, which is a major expense in wiring a building.

There are problems with this. The electrical component, either the switch or the duplex outlet, should be flush with the outer surface of the drywall. Typically, the drywall is ⅝-inch to ½-inch thick. However, thicker drywall can be employed. A double thickness of drywall can be used to provide a greater fire rating. In these embodiments, the drywall ring would not place the electrical component flush with the outer surface of the drywall.

To deal with these situations, the electrician must remove the electrical component, insert an electrical box extension, and reinsert the component. The electrical box extension is basically a rectangular sleeve with upper and lower flanges that engage the surface of the drywall. The electrical component is then attached via screws to the drywall ring with the extension between the component and the ring. Tightening the electrical component makes it flush with the outer surface of the drywall. This works, but it requires a great deal of electrician time. It would be better for the electrician to do this without removing the electrical component. But, because existing extension sleeves must be between the drywall ring and the electrical component, the electrical component must be removed to attach the extension sleeves.

Frequently, the electrical box will not be properly positioned. This can prevent the electrical component from being flush with the drywall, thus creating a possible unsafe condition.

SUMMARY OF THE INVENTION

The present invention is premised on the realization that an electrical box extension sleeve that has a size that permits it to fit within the raised portion of a drywall ring, can be added as part of an electrical assembly and utilized when necessary. The electrical box extender is used with separate retention clips that are attached to the extender after drywall installation. The clips are designed to extend beyond the extender to engage the drywall. If not needed, the extender remains in the wiring assembly between the component and drywall ring or electric box if there is no drywall ring. Thus, these can be used in pre-assembled wiring assemblies and utilized only when needed. They can be located in an appropriate position when needed without removing the electrical component. They can be used to compensate for increased thickness of drywall or to level an electric component with the surface of the drywall.

Preferably, the extension has an outer dimension that mates with the inner dimension of a drywall ring or electric box if there is no drywall ring. This eliminates any gap between the electrical component and drywall. Safety conditions are significantly improved by reducing the possibility of a fire caused by arc flashing, should a component fail.

Other objects and advantages of the present invention will be further appreciated in light of the detailed description and drawings, in which:

DETAILED DESCRIPTION OF THE DRAWINGS

Figure 1:
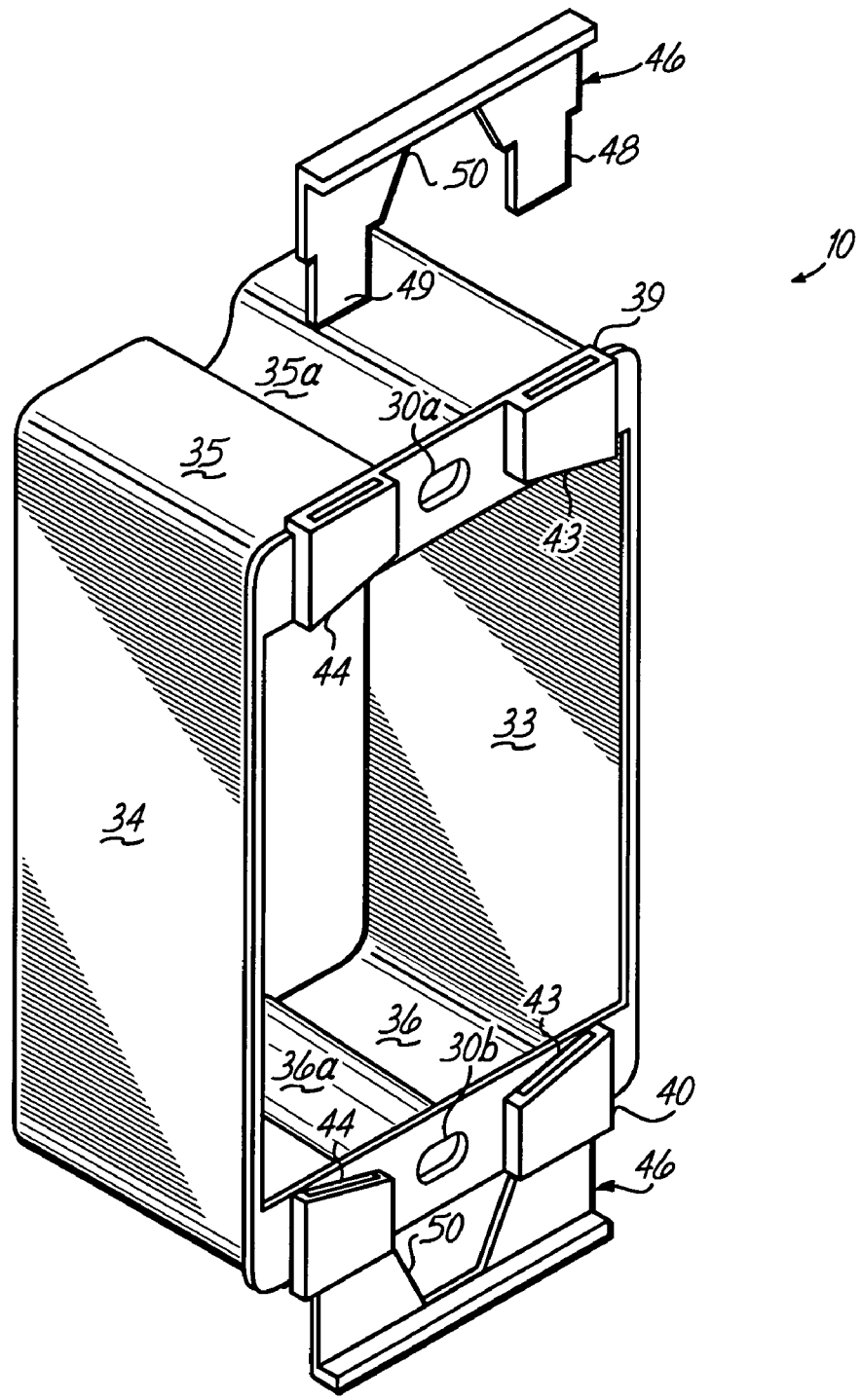
FIG. 1 is a perspective view of the present invention showing the retention clips.

The present invention is an extension sleeve 10 for use in an electrical assembly 11. An electrical assembly will include an electrical box 12 with electric cable 15 attached to the box with wires 16 running into the box, extending through the opening in the extension sleeve 10 and attached to an electrical component 29 such as a switch or a duplex outlet, or a plurality of such electrical components, i.e., multiple switches or outlets in a single box. As shown in FIG. 2B, the electrical assembly 11 includes an electrical box 12 which is attached to a mounting bracket 13 designed to attach to stud 14. The electrical cable 15 extends through a hole in the box 12.

As shown, a drywall ring 17 is attached with screws 18 to the electrical box 12 with screws extending through holes 20 in the mounting bracket 13 and into holes 21 in the electrical box 12. The drywall ring includes a peripheral portion 23 and a raised annular portion 24. Extended from the raised portion 24 are tabs 25 which each include a threaded screw hole 26.

Figure 2A:
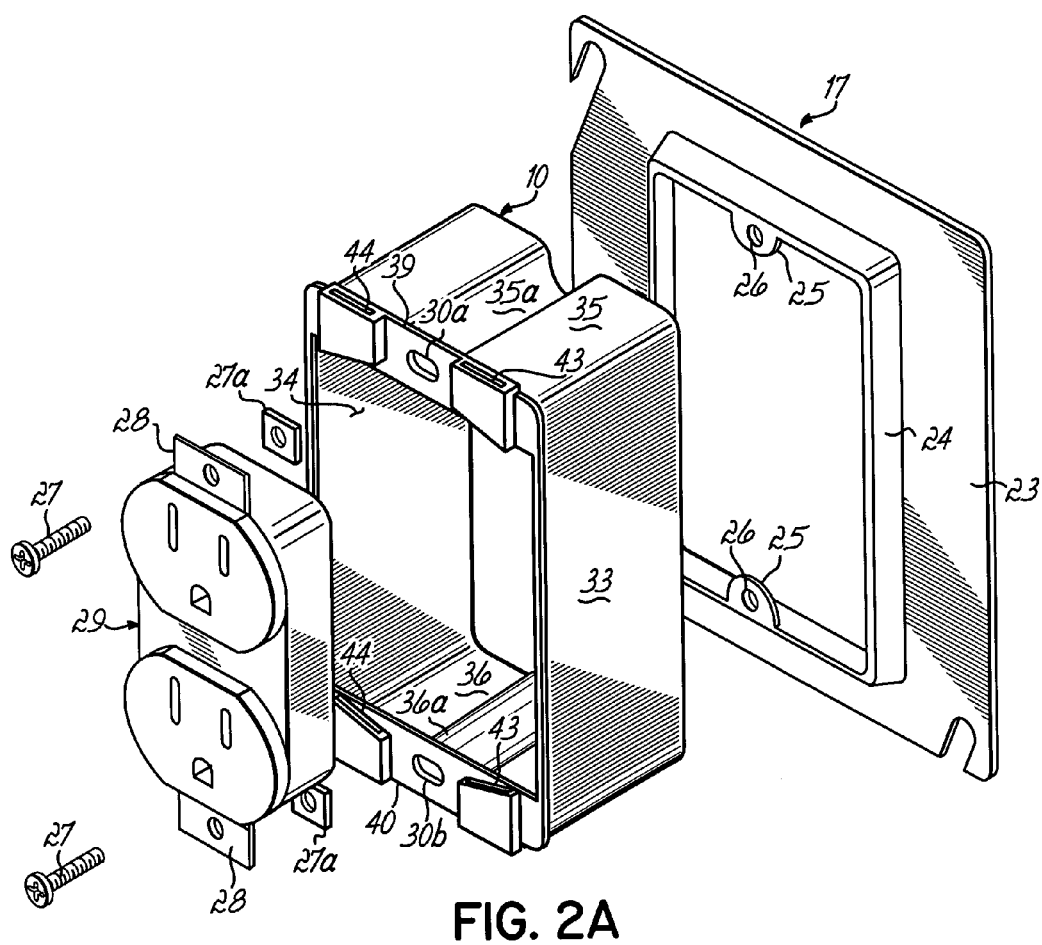
FIG. 2A is an exploded perspective view of the present invention showing the electrical component extender and drywall ring.
Figure 2B:
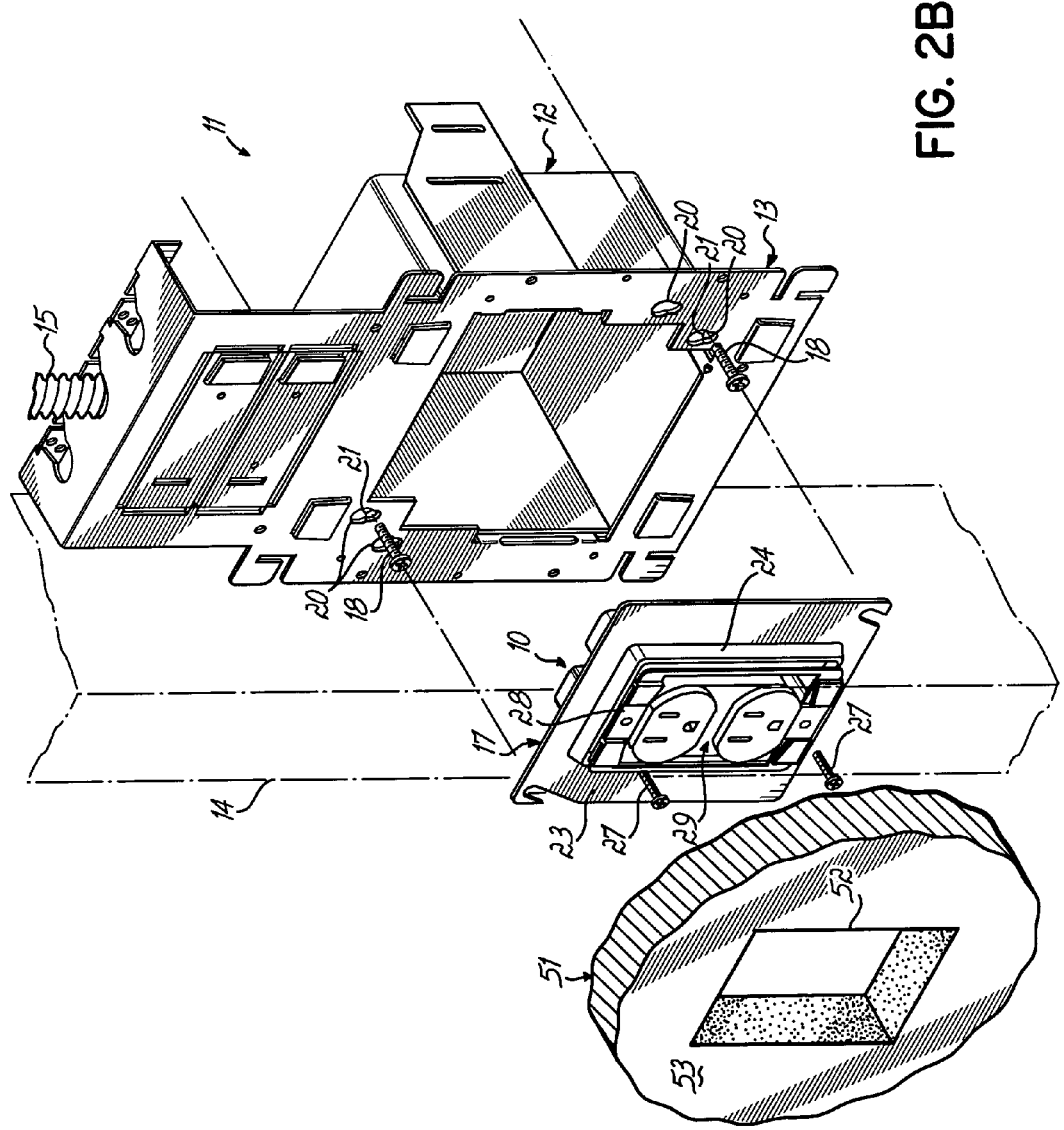
FIG. 2B is an exploded view with the portion from FIG. 2A assembled.

Positioned adjacent the exterior surface of the drywall ring is the extension sleeve 10 which is held in position with the mounting screws 27 that extend through the mounting tabs 28 of an electrical component 29 such as a duplex outlet, as shown in FIG. 2A. These mounting screws 27 extend through the mounting tabs 28 of the duplex outlet 29 through retention washers 27A and holes 30a and 30b in the extension sleeve 10 and, finally, into the threaded holes 26 in tabs 25 of the drywall ring.

The drywall ring may be omitted. In that situation, the extension would be sized to fit within the electric box and the electrical component would attach directly to the box.

Preferably, the extension sleeve 10 is a continuous hollow sleeve, open at two ends. It includes two opposed walls 33 and 34, and upper and lower short walls 35 and 36. Walls 35 and 36 include scalloped portions 35(a) and 36(a). The outer dimensions of the extension box are intended to mate with the interior edge 17(a) of drywall ring 17. Thus, the scalloped portions 35(a) and 36(a) provide clearance between the walls 35 and 36 and tabs 25.

Preferably, there will be minimal clearance between the extension sleeve 10 and the interior edge 17(a) of drywall ring 17. This clearance should be less than ⅛ inch, and preferably, less than 1/16 inch or less, to minimize the risk of fire from arc flashing. If arc flashing is not a concern, the clearance can be greater.

Extended from the outer edges of walls 35 and 36 are flanges 39 and 40. Holes 30a and 30b extend through the flanges 39 and 40. Adjacent each mounting hole are first and second sleeves 43 and 44 on both flanges 39 and 40. These sleeves are rectangular in shape. As shown in FIG. 1, these sleeves are adapted to receive drywall engaging clips 46. The drywall engaging clips 46 are C-shaped clips that have first and second tabs 48 and 49. The clips include a central opening 50 which is adapted to allow for mounting screws from a cover plate.

The size of the extension sleeve 10 without the clips 46 will be equal to or slightly smaller than the opening in the drywall ring 17. The extension sleeve 10 rests within the drywall ring 17 with holes 30a and 30b aligned with holes 26 in the drywall ring 17. Holes 30a and 30b are approximately 3.25 inches on center for applications in the United States market. The extension sleeve 10 is sized to extend through the opening cut 52 in the drywall 51 to facilitate the drywall ring 17. Generally, the depth of the extension will be ⅛ to 2 inches, more preferably ¼ to 1½ inches.

Because of the size of the extension 10, it can be included in a pre-wired assembly 11 which is installed prior to drywall installation. A pre-wired assembly 11 will include the electrical component 29, generally a duplex outlet or a switch (without drywall ears), which is wired to cable 15, which is attached to the electrical box 12. This will preferably include a mounting bracket 13 and a drywall ring 17 with the bracket 13 mounted between the box 12 and the drywall ring 17. There are many different mounting brackets. Some mount to a stud, others mount to the floor. The particular bracket 13 shown in the figures is described more particularly in pending U.S. application Ser. No. 10/888,858, filed Jul. 9, 2004, the disclosure of which is incorporated herein by reference. Sandwiched between the electrical component 29 and the drywall ring 17 is the drywall extension 10.

Figure 3:
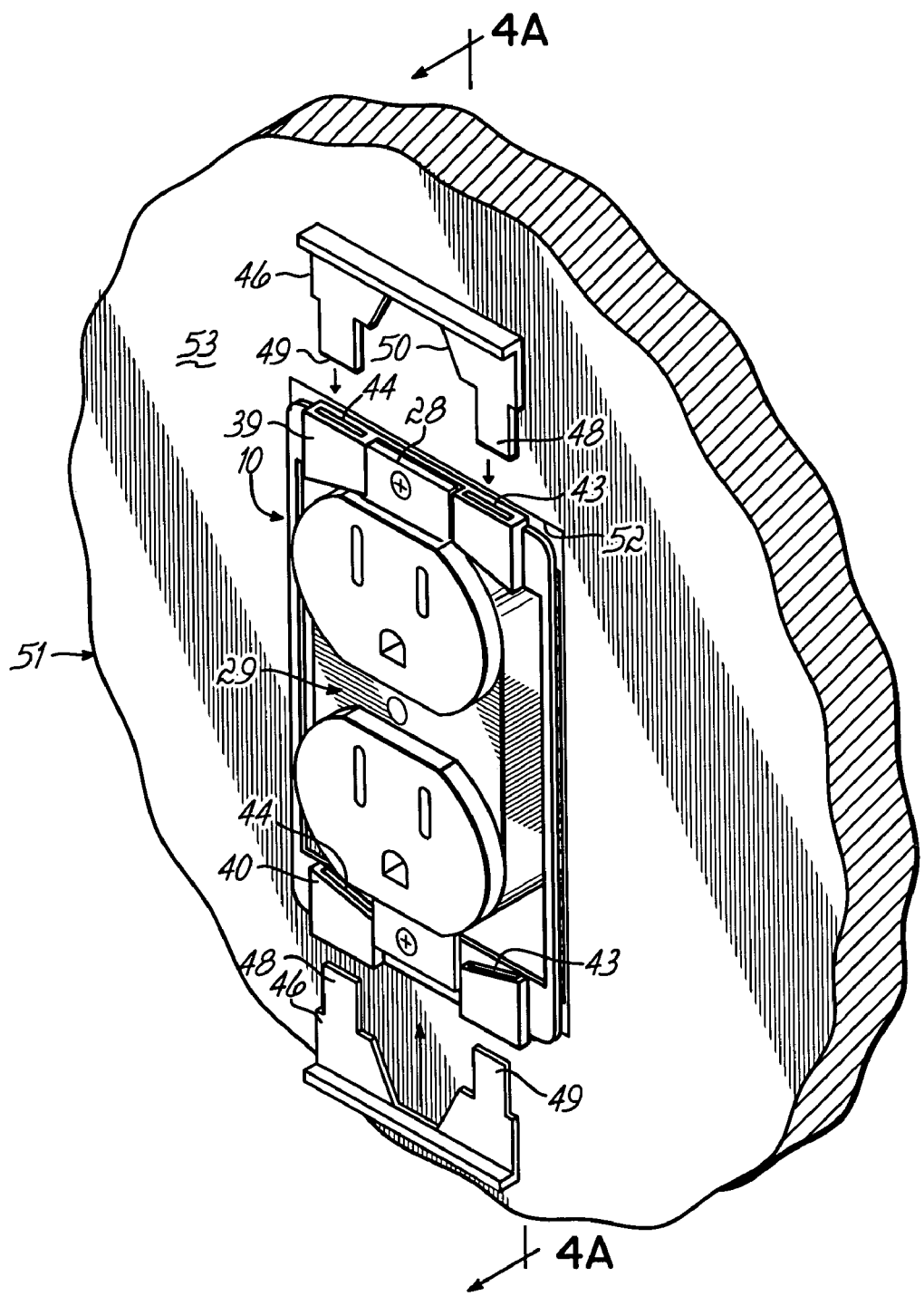
FIG. 3 is a perspective view of the present invention with drywall.

This assembly 11 is delivered to the job site for the electrician to install. The electrician will simply mount the bracket 13 to the desired location. Or, if a box 12 is employed without a bracket, mount the box directly to the intended location such as a stud, or the like. The electrician then connects cable 15 as required. Drywall 51 is installed directly over the drywall ring 17. A router or saw is used to cut a hole 52 through the drywall to allow the raised portion 24 of ring 17 to extend through the drywall 51, as shown in FIGS. 2B and 3. This will, in turn, expose the electrical component 29. If, as shown in FIG. 4B, the electrical component 29 is flush with the outer surface 53 of the drywall 51, the extension sleeve 10 may not be extended. However, in the position shown in FIG. 4B, the extender acts as a shield between the drywall and electrical component, thus improving safety by limiting surface area if arc flash would occur.

Figure 4A:
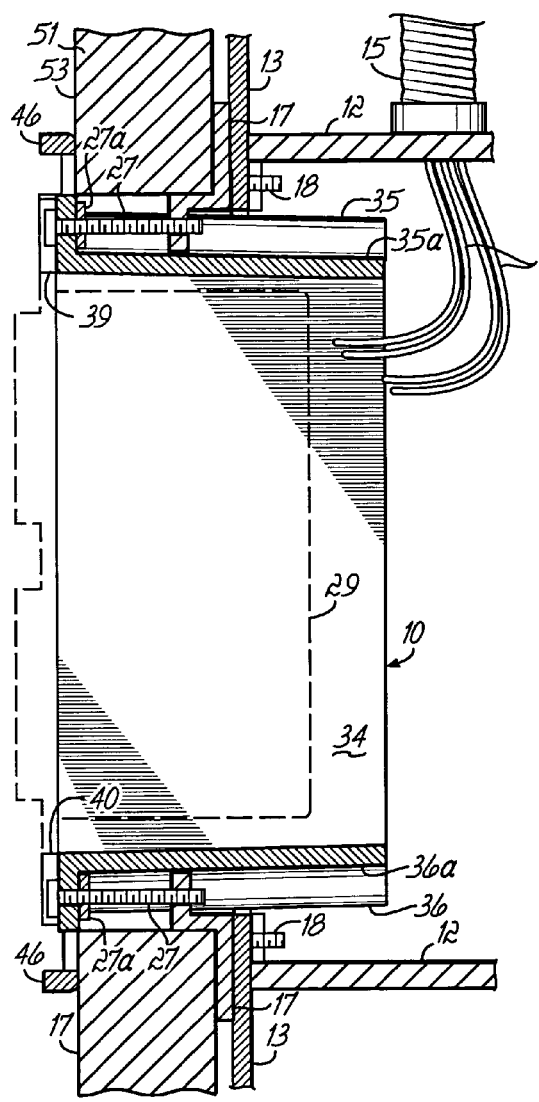
FIG. 4A is a cross sectional view with the extension clips attached.
Figure 4B:
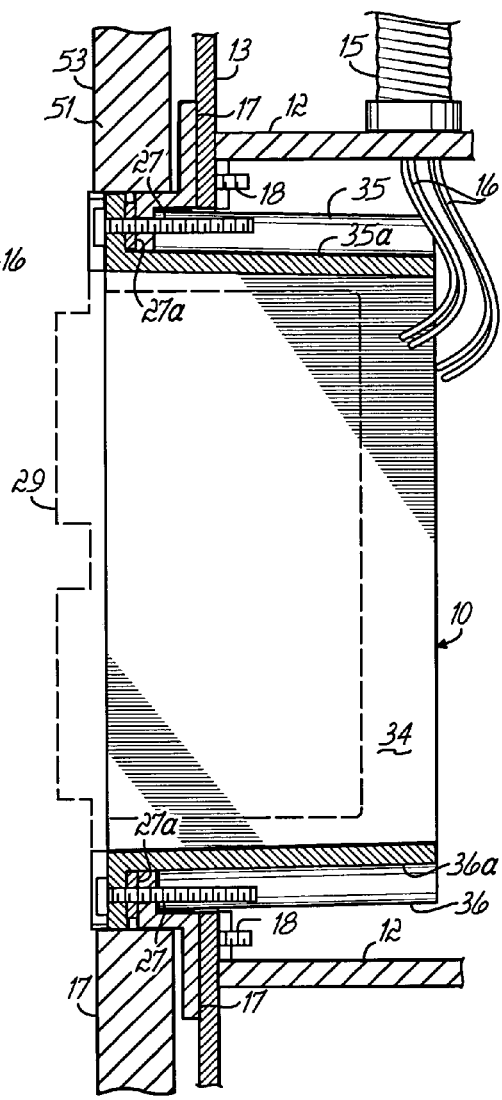
FIG. 4B is a cross sectional view without the extension clips.

However, if, as shown in FIG. 4A, the surface of the electrical component 29 is within the drywall 51 and needs to be pulled out to compensate for thicker drywall or to level the component with the drywall surface, the mounting screws 27 will be loosened and the sleeve 10 pulled out. Clips 46 will then be inserted into flanges 39 and 40. As shown in FIG. 4A, the clips will contact the surface 53 of the drywall. The screws 27 on the electrical component are then tightened, making the surface of the electrical component flush with the drywall. A cover plate (not shown) is then installed over the electrical component 29 and extension sleeve 10. Preferably, the extension will be used in all situations as a means to eliminate any gap between the drywall ring or box and the drywall. This will reduce the risk of fire caused by arc flashing. In effect, the sleeve will act as a shield between the electric component and the drywall, thus creating a safer condition.

The extension sleeve 10 can be formed from metal or plastic, with plastic being preferred. The plastic can be fire rated, if desired. Clips 46 are preferably stamped from metal.

Figure 5:
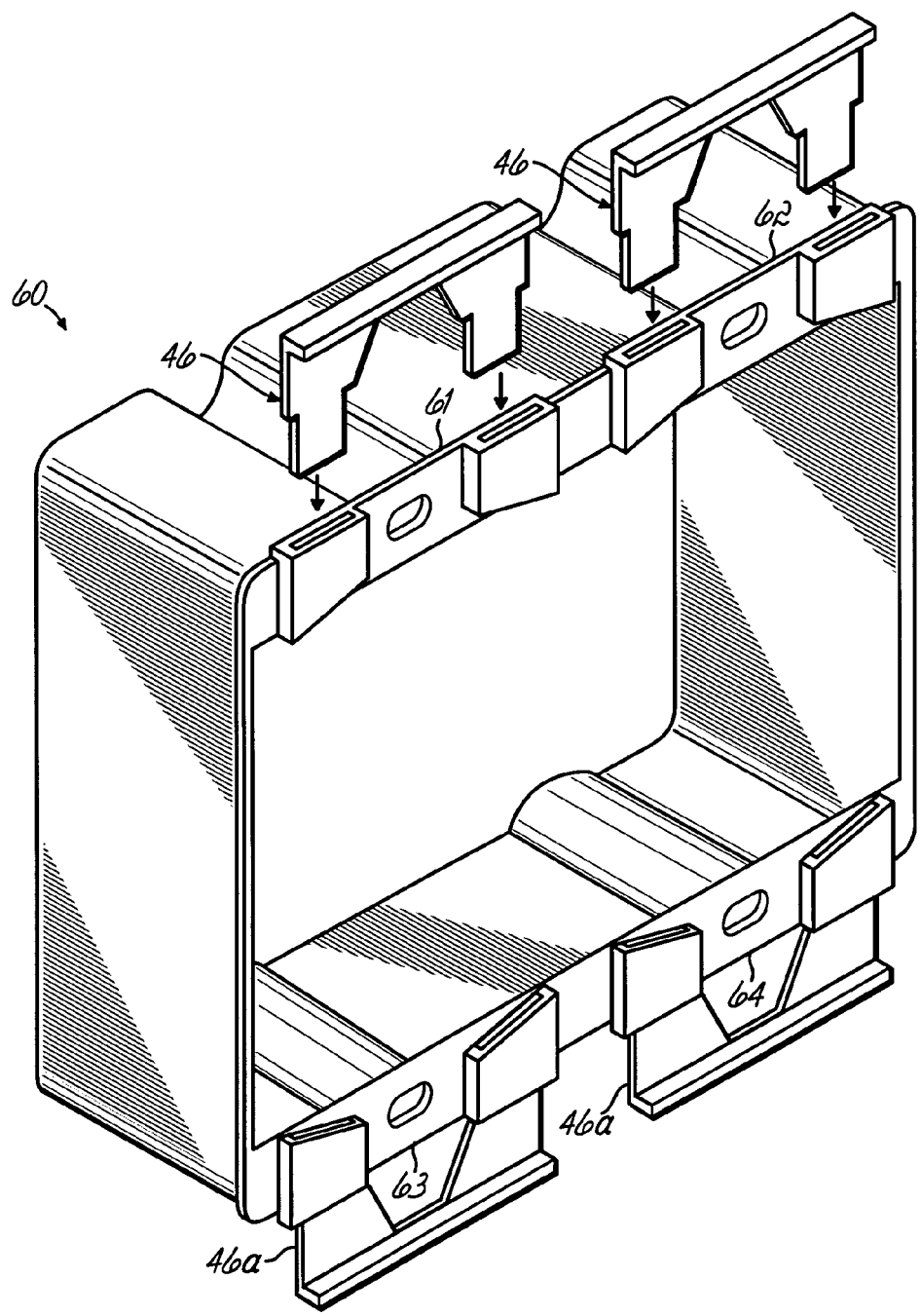
FIG. 5 is a perspective view of an alternate embodiment of the present invention.

As shown in FIG. 5, a larger extension sleeve 60 can be used when the electrical box 12 is designed to hold two or more electrical components 29. In the embodiment, shown in FIG. 5, the extension 60 has two upper sets of sleeves 61 and 62 adapted to receive two clips 46 and two lower sets of sleeves 63 and 64 also adapted to hold two clips. Extension sleeve 60 is installed in the same manner as extension sleeve 10.

The electrical extension sleeves of the present invention will greatly facilitate installation of pre-wired assemblies. The extension sleeve can be part of the pre-wired assembly so that when brought to the construction site one can guarantee that the outer surface of the electrical component will be flush with the outer surface of the drywall. The use of this device reduces the time required to install electrical assemblies. The expense of adding the extension sleeve to the pre-wired assembly is more than offset by the savings in installation costs. Use of this product also reduces fire risk.

This has been a description of the present invention along with the preferred method of practicing the present invention. However, the invention itself should only be defined by the appended claims,

I claim:

1. An electrical box extension comprising a hollow sleeve having first, second, third and fourth opposed walls, said third and fourth opposed walls having a first flange and a second flange, said flanges generally perpendicular to said third and fourth walls;

said sleeve adapted to receive an electrical component with holes in said first and second flanges adapted to receive mounting screws of said electrical component;

each one of said flanges having a sleeve with an opening parallel to said one flange; and first and second drywall engaging clips separate from said extension adapted to extend through said openings to engage said first and second flanges.

2. The electrical box extension claimed in claim 1 wherein said first and second flanges each have two openings adapted to receive first and second tabs of said first and second drywall engaging clips.

3. The electrical box extension claimed in claim 2 wherein said clips have a central opening adapted to permit passage of a screw for mounting a cover plate.

4. The electrical box extension claimed in claim 1 wherein said hollow sleeve is a continuous rectangular sleeve.

5. The electrical box extension claimed in claim 1 wherein said sleeve is a fire rated plastic.

6. The electrical box extension claimed in claim 1 wherein said sleeve has an exterior surface which mates with an interior edge of a drywall ring.

7. The electrical box extension claimed in claim 6 having upper and lower walls each having scalloped portions.

8. The electrical box extension claimed in claim 1 wherein said sleeve has an exterior surface that mates with an interior edge of an electrical box.

9. A pre-wired electrical assembly comprising an electrical box, an electrical component attached to said electrical box and wired to a cable attached to said electrical box, an electrical box extension having first and second flanges, said extension mounted to said assembly between said electrical component and said box with first and second mounting screws extending through said flanges in said electrical component and fasteners extended through said flanges in said extension fixing said extension and said component to said electrical box, separable drywall engaging clips attachable to said flanges.

10. The pre-wired electrical assembly claimed in claim 9 further comprising a drywall ring mounted to said electrical box wherein said electrical component is mounted to said drywall ring with said extension interposed between said electrical component and said drywall ring and wherein said first and second flanges of said extension engage said drywall ring.

11. The pre-wired assembly claimed in claim 10 wherein said extension has an exterior surface which mates with an interior edge of said drywall ring.

12. The pre-wired assembly claimed in claim 10 further comprising a mounting bracket interposed between said drywall ring and said electrical box.

13. The pre-wired assembly claimed in claim 12 wherein said hollow sleeve is a continuous generally rectangular sleeve having two walls with scalloped portions.

14. The pre-wired assembly claimed in claim 13 wherein said sleeve is a fire rated plastic.

15. The pre-wired assembly claimed in claim 13 wherein said drywall engaging clips include a central opening adapted to permit passage of mounting screws for a cover plate.

16. The pre-wired assembly claimed in claim 10 wherein said first and second flanges each have two openings adapted to receive first and second tabs of said first and second drywall engaging clips.

17. The method of installing the pre-wired assembly claimed in claim 16 comprising attaching said bracket to a support structure, covering said assembly with drywall, providing an opening through said drywall to permit access to said electrical component, loosening said fasteners and pulling said extension beyond an outer surface of said drywall, attaching retention clips to said flanges of said extension ring and tightening said mounting screws to thereby draw said extension and said electrical component flush with said outer surface of said drywall.

18. The pre-wired assembly claimed in claim 9 wherein said electrical component is a duplex outlet.

19. The pre-wired assembly claimed in claim 9 wherein said electrical component is an electric switch.

20. The pre-wired assembly claimed in claim 19 further comprising a cover plate over said switch with mounting screws extended into said upper and lower tabs of said switch and through holes in said clips.

\* \* \* \* \*